No. 862,529. PATENTED AUG. 6, 1907.
H. B. WHIPPLE.
STEAM ENGINE PUPPET VALVE.
APPLICATION FILED JULY 23, 1906.

WITNESSES:

INVENTOR
Henry B. Whipple.
BY Shepherd & Parker
Attorneys No. 862,529.

PATENTED AUG. 6, 1907.

H. B. WHIPPLE.
STEAM ENGINE PUPPET VALVE.
APPLICATION FILED JULY 23, 1906.

WITNESSES:
H. F. Doyle.
John S. Powers

INVENTOR
Henry B. Whipple.
BY Shepherd & Parker
Attorneys

No. 862,529. PATENTED AUG. 6, 1907.
H. B. WHIPPLE.
STEAM ENGINE PUPPET VALVE.
APPLICATION FILED JULY 23, 1906.

INVENTOR
Henry B. Whipple.
BY Shepherd & Parker
Attorneys

No. 862,529. PATENTED AUG. 6, 1907.
H. B. WHIPPLE.
STEAM ENGINE PUPPET VALVE.
APPLICATION FILED JULY 23, 1906.

WITNESSES:

INVENTOR
Henry B. Whipple.
BY Shepherd & Parker
Attorneys

UNITED STATES PATENT OFFICE.

HENRY B. WHIPPLE, OF JERSEY SHORE, PENNSYLVANIA.

STEAM-ENGINE PUPPET-VALVE.

No. 862,529.   Specification of Letters Patent.   Patented Aug. 6, 1907.

Application filed July 23, 1906. Serial No. 327,432.

*To all whom it may concern:*

Be it known that I, HENRY B. WHIPPLE, a citizen of the United States, residing at Jersey Shore, in the county of Lycoming and State of Pennsylvania, have invented certain new and useful Improvements in Steam-Engine Puppet-Valves, of which the following is a specification.

This invention relates to new and useful improvements in steam engines and it has particular relation to the valves and valve operating mechanism thereof.

The primary object of the present invention is to increase the power of engines of either the stationary or traction type and reduce the consumption of fuel. These objects are attained by means of certain novel features of construction and arrangement which will be hereinafter set forth.

To this end the invention embodies as a main factor in the attainment of the results stated a novel arrangement and construction of admission and exhaust valves. This novel arrangement of valves contemplates positioning the exhaust valves of the engine in the main steam chest and in communication with the engine cylinder at each end thereof. In connection with this arrangement, the admission valves are made adjustable in order that the steam cut-off may be regulated to occur at any selected point in the stroke of the piston. On the other hand, the exhaust valves are adjustable only at the steam chest, and are not adjustable with relation to the adjustment of the cut-off mechanism, but are constant, so that the exhaust, as regulated from the steam chest, is timed to occur always at the same point in the stroke of the piston in either direction, irrespective of the adjustment of the cut-off mechanism. In this manner the time the exhaust takes place is not affected by changing the cut-off of the steam valves; but it is to be kept in mind that mechanical devices at the steam chest are provided whereby the exhaust may be timed to occur at any selected point in the travel of the piston. The amount of steam admitted into the engine cylinder may be varied as desired and is controlled by timing the cut-off to occur at any selected point in the stroke, which timing depends upon the adjustment of the cut-off mechanism. The steam, no matter in what amount it is admitted into the engine, travels the full length of the cylinder and passes from the respective ends thereof through the exhaust valves. This mode of operation insures a maximum degree of power due to using the steam during practically the entire stroke of the piston.

A novel feature in the construction of my valves which contributes to the attainment of the object set forth resides in the provision of valves which are perfectly balanced, and which are, as far as it is possible to attain, practically instantaneous in their operation.
By reason of the provision of perfectly balanced valves which open and close practically instantly, the steam is admitted into the cylinder quickly and initial pressure is obtained without loss of steam, and thus a saving in fuel and a gain in power is obtained.

In the present development of the art, the valves of engines open comparatively slowly and the steam commences to exhaust at some distance away from the end of the cylinder before the piston has completed its stroke so that the force of the steam is not exerted on the piston throughout its entire stroke but only for a part of its stroke. A waste of fuel and consequent loss of power necessarily result from this condition.

The construction of the valves, besides increasing the power in the manner above set forth, contributes to this object also in an entirely different manner. Said valves are so constructed that they need no lubrication, and on account of their perfect balance they are moved to and away from their seats with a minimum degree of friction. The advantages of valves which need no lubrication will be apparent in the consideration of the disadvantages of the lubricated valves ordinarily employed. The ordinary steam engine requires considerable power to move its main valves, due to improper balance, friction from large bearing surfaces, and variation in lubrication. It is a well known fact in steam engineering that any failure to thoroughly lubricate the valves and seats in the piston and slide valve types reduces the power of the engine to an enormous extent, on account of the great frictional bearing surfaces which these valves present. Hence, inasmuch as the valves of the present invention require no lubricant and have practically no friction in their operation, a great saving in power is effected.

It is a further consideration of the present invention to provide valves having the smallest possible percentage of leakage. This is accomplished by forming said valves with beveled bearing surfaces. The ordinary steam engine employs valves of the piston and slide type, which are known to leak badly even when in good condition, whereas the valves of the present invention, being formed with beveled bearing surfaces will not have the same loss from leakage, and, not requiring any oil for their seats, will not be affected by the condition of lubrication. It follows, therefore, that the prevention or reduction of leakage increases the motive force of the steam within the engine cylinder.

Another object of the present invention is to provide means for preventing involuntary actions of the piston, when the engine is running under its momentum, with the valves in the "drifting" position. This object is accomplished by the peculiar and novel arrangement of admission and exhaust ports with relation to one another and to the engine cylinder, whereby when the valves are "drifting" the engine cylinder communicates on either side of the piston with the outside atmosphere through the adjacent admission and exhaust ports. As the exhaust valves from the different ends of stroke open into the same passage in the cylinder casing it follows that the two ends of the cylinder are also open to each other. "Drifting" position is a position between forward and back up position, and in that position all valves in the steam chest are held in their normal positions,—that is the exhaust valves being open and the steam valves being closed. In "drifting" position the reversing lever is in an upright position.

Another object of the present invention is to provide for the reduction of mechanical elements in a train of valve gear and to provide a construction in which all the parts are readily accessible for the purpose of repairs and inspection. The reduction of mechanical elements eliminates practically all strain upon the valve gear 15 outside of the steam chest, and for this reason all parts can be made of light construction. On this account and on account of the simplicity of the device, the cost of construction will be greatly reduced.

Still another object resides in providing a construction adapted for use with the ordinary reverse lever, so that the present invention may be readily installed in locomotives and other steam engine actuated machines without changing the usual method of operation.

The detailed construction will appear in the course of the following description, in which reference is had to the accompanying drawings forming a part of this specification, like numerals designating like parts throughout the several views, wherein.

In the practical embodiment of my invention I employ an engine comprising a cylinder A, a reciprocating piston, B and a steam chest C mounted upon the cylinder A. The steam chest C is of novel construction and comprises an integral casting 1 which serves as a housing for the admission and exhaust valves. The casting 1 is of substantially square shape and is formed with a centrally located compartment 2 of rectangular outlines and spaced away on all sides from the casting 1. Steam chambers 3 and 4 are thus provided in the casting 1 and the spaces between the respective end walls of the compartment 2 and the casting 1 serve as passages 5 through which communication is had between the chambers 3 and 4. The compartment 2 is formed with integral longitudinal webs 6 arranged in spaced parallel relation and dividing said compartment into admission valve chambers 7 and 8 located on each side thereof and into a central exhaust passage which is separated into independent exhaust valve chambers 9 and 10 by a central transverse web 11. The sides of the compartment 2 are connected with the webs 6, and the webs 6 are connected with one another adjacent to the ends of the compartment 2 by integral alined transverse webs 12 spaced away from the end walls of said compartment in parallel relation, whereby vertical passages $7^a$, $8^a$, $9^a$ and $10^a$ are afforded from the top of the compartment 2 to the cylinder A. The cylinder A and casting 1, constructed generally as above set forth, are closed by an overlying top plate 13, suitably recessed and flanged to receive projecting portions of the casting 1 and webs 6 therein.

Communication is had between the chambers 3 and 4 and the respective adjacent valve chambers 7 and 8 by respective openings 14 and 15 formed in the side walls of the compartment 2. The side walls of the compartment 2 and the adjacent sides of the webs 6 are formed contiguous to the respective openings 14 and 15 with respective upper inclined valve seats $7^b$ and $8^b$ and lower inclined valve seats $7^c$ and $8^c$. The several valve seats are of rectangular outlines and are formed in the portions of material between the webs 12. The valve chamber 7 is formed with an angular longitudinal core 16 leading from the valve seat $7^c$ to the exhaust valve chamber 9 rearwardly of the web 11, and the valve chamber 8 is formed with an angular longitudinal core 17 leading from the valve seat $8^c$ to the exhaust valve chamber 10 forwardly of the web 11. The cores 16 and 17 are formed with angular off-set passages 18 and 19 extending through the base of the casting 1 and occupying the entire distance between the webs 12 and so disposed as to be in registry with steam inlet ports 20 and 21 formed in the cylinder A and extending to the adjacent ends thereof. The said ports 20 and 21 extend transversely beneath the steam chest C and are in communication at their ends with the respective adjacent passages $7^a$ and $8^a$. The ends of the compartment

2 and the sides of the webs 6 forming the exhaust valve chambers 9 and 10 are provided with respective upper and lower inclined valve seats $9^b$ and $10^b$ and $9^c$ and $10^c$ disposed on opposite sides of the cores 16 and 17. The exhaust valve chambers 9 and 10 extend through the base of the casting 1 and communicate on each side of the web 11 with a recess 22 formed in the cylinder A. The recess 22 extends transversely of the cylinder A beneath the steam chest C and communicates at its ends with the vertical passages $9^a$ and $10^a$. Located in the valve chambers 7 and 8 and 9 and 10 are valves respectively designated as follows: $23^b$, $24^b$, $25^b$ and $26^b$ formed with inclined bearing surfaces and designed to seat upon the upper valve seats $7^b$, $8^b$, $9^b$ and $10^b$ in the order named and valves $23^c$, $24^c$, $25^c$ and $26^c$ similarly constructed to the valves above named and designed to seat upon the lower valve seats $7^c$, $8^c$, $9^c$ and $10^c$. The valves above named are disposed in superposed pairs having a common numerical designation and in this relation are designed to move simultaneously in the same direction. To this end said valves are connected in superposed pairs by vertical rods 27 extending in plurality through each valve and through the plate 13. The steam admitted into any one of the valve chambers impinges against the underneath surface of the upper valve and the upper surface of the lower valve. In providing a perfectly balanced valve having double valve heads it is necessary that the steam pressure be equalized, and to this end the steam bearing surfaces of the valves as above set forth are co-extensive.

The above description relates to the novel steam chest and construction and arrangement of valves therein, in connection with which novel valve operating mechanism is employed. Generally speaking, the valve operating mechanism comprises operating cylinders, pistons movable therein and connected to the rods 27, valves for controlling the admission of steam to the operating cylinders, and a means controlled by the movement of the engine piston for operating said last named valves. The rods 27 have movement through stuffing boxes 28 in the plate 13 and the rods of the respective valves have hinged connection with a common cross head 29. Valve operating cylinders 30, 31, 32 and 33 are provided for the respective valves $23^b$ and $23^c$, $24^b$ and $24^c$, $25^b$ and $25^c$ and $26^b$ and $26^c$. The cylinders 30 and 31 are counterparts in construction and are shown in detail with their appurtenant elements in Fig. 8. The cylinders 32 and 33 are likewise counterparts in construction and are shown in detail in Fig. 9, differing only from the cylinders 30 and 31 in the arrangement of their appurtenant elements.

Pistons 34 are disposed within the cylinders 30 and 31 and are carried by piston rods 35 which have rigid connection with the respective cross heads 29. The admission valves are normally held closed, and to this end the pistons 34 are maintained in the lower portion of the cylinders, but are moved upwardly to open the admission valves by the pressure of steam which is admitted into the lower portions of the cylinders 30 and 31. The pistons 34 are provided with upwardly extending posts 36 projecting through the top of the cylinders 30 and 31. The pistons 34 are held in their lowermost position to close the admission valves by expansive spiral springs 37 surrounding the posts 36.

Pistons 38 are disposed within the cylinders 32 and 33 and are carried by piston rods 39 which have rigid connection with the respective cross heads 29. The exhaust valves are normally held open, and to this end the pistons 38 are maintained in the upper portion of the cylinders but are moved downwardly to close the exhaust valves by the pressure of steam which is admitted into the upper portion of the cylinders 32 and 33. The pistons 38 are held in their uppermost position to open the exhaust valves by expansive spiral springs 44 surrounding the piston rods 39.

Figures 1, 11:
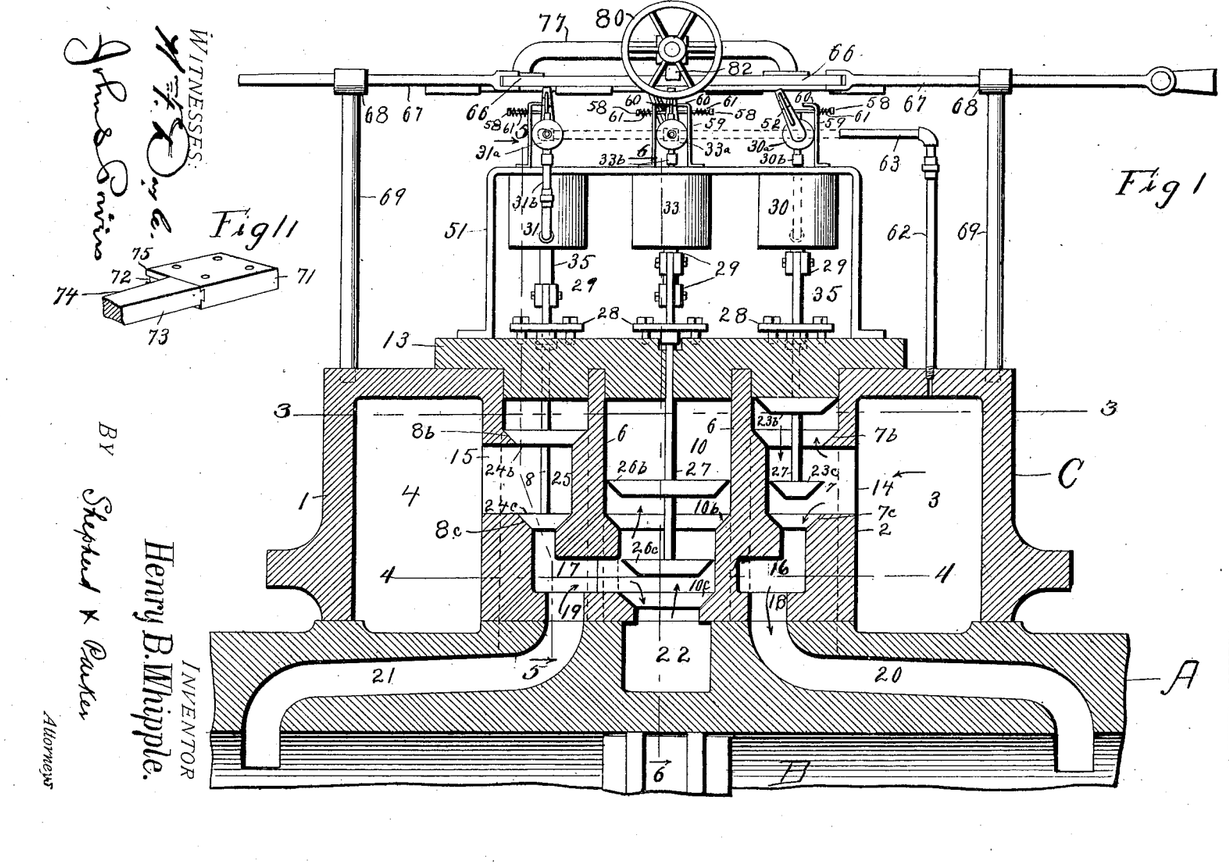
Figure 1 is a longitudinal section through the steam chest of an engine constructed in accordance with my invention, showing the arrangement of valves and valve operating mechanism.
Fig. 11 is a fragmentary perspective view showing the detailed construction of a sliding element for operating the valves shown in Figs. 9 and 10.
Figure 7:
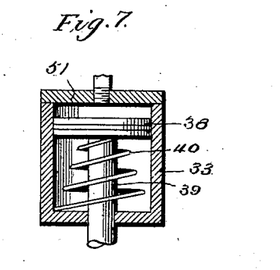
Fig. 7 is a longitudinal sectional view of a steam chamber and piston therein for operating the main exhaust valves.
Figure 8:
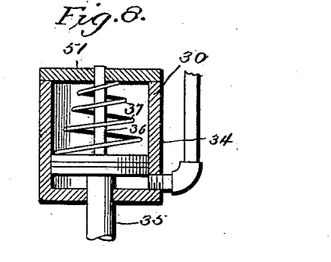
Fig. 8 is a longitudinal sectional view of a steam chamber and piston therein for operating the main admission valves.
Figure 9:
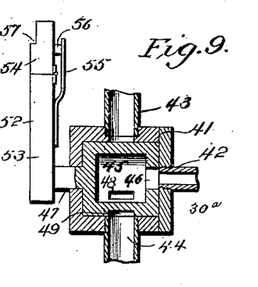
Figs. 9 and 10 are vertical longitudinal and transverse sectional views of rotary plug valves which control the admission of steam into the chambers shown in Figs. 7 and 8.
Figure 10:
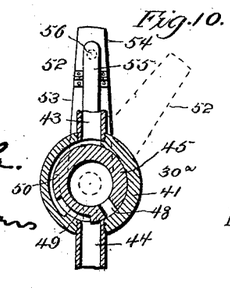

The supply of steam to the cylinders 30, 31, 32, and 33 is controlled by rotary auxiliary valves, respectively designated $30^a$, $31^a$, $32^a$ and $33^a$ which are counterparts in construction and mode of operation and are shown in detail in Figs. 9 and 10. Hence a description of a single valve, arbitrarily $30^a$, will be sufficient to set forth the construction of the entire series. The valve $30^a$ serves as a combined admission and exhaust valve, and to this end comprises a cylindrical casing 41, provided in its end wall with a steam admission port 42, and in its circumference with port 43 for exhausting steam to the atmosphere and at a diametrically opposite point with a port 44 for discharging steam into the adjacent operating cylinder controlled thereby. A hollow rotary plug 45 is mounted within the casing 41 and is provided at one end with a central opening 46 designed to be in constant registry with the port 42 and at its other end with a laterally extending boss 47. The plug 45 is formed with a longitudinal slot 48 in its periphery which is designed, in one position of said plug, to be in registry with the port 44. Means are provided for establishing communication from the operating cylinder to the exhaust port 43 through the port 44 during the period that the slot 48 is out of registry with the port 44: The plug 45 is formed with a peripheral recess 49 which overlies for a part of its length a circumferential recess 50 formed in the inner surface of the casing 41 and extending to a point where it meets the port 43. As shown in Fig. 10, the slot 47 is out of registry with the port 44 and the valve $30^a$ is exhausting. In this operation the recess 49 is in partial registry with the port 44 and with the recess 50, whereby an uninterrupted passage between the plug and the casing is afforded for the travel of exhaust steam from the adjacent operating cylinders. The rotary plug valves are supported from the operating cylinders 30, 31, 32, and 33 with which they communicate, and said cylinders are supported or depend from a frame 51 of inverted U shape mounted upon the plate 13. The frame 51 in the preferred embodiment of the invention forms a top plate for all of said cylinders, as is shown in Figs. 1, 7, and 8.

Novel adjustable means are provided for actuating the auxiliary valves $30^a$, $31^a$, $32^a$, and $33^a$ comprising elements carried by said valves and elements co-acting therewith and controlled by the movement of the engine piston. The boss 47 of the plug 45 by which said plug is journaled in the casing 41 carries an integral or rigidly secured lever 52 formed with a stationary lower section 53 and a hinged upper section 54 having a movement with relation to the section 53. A leaf spring 55 is secured to the section 53 and terminates at its free end in a stud 56 which bears against the section 54 and restricts the pivotal movement thereof. The hinged section 54 is formed at its upper end with a shoulder 57 by which it is engaged by the operating element. The lower portion 53 of the lever 52 has connection with a headed pin 58 adapted to be moved in a horizontal direction by said lever. The pin 58 projects through and is guided by a vertical post 59 mounted upon the frame 51 and formed with an angular or offset upper end 60 which engages said lever and restricts the movement thereof upon its restoration to normal position. A retractile spring 61 surrounds the pin 58 forwardly or rearwardly of the post 59, as shown in Fig. 1, and is adapted to draw said pin forwardly or rearwardly as the case may be, to restore the lever 52 and plug 45 to initial position, when said lever is disengaged by the operating element.

Figure 2:
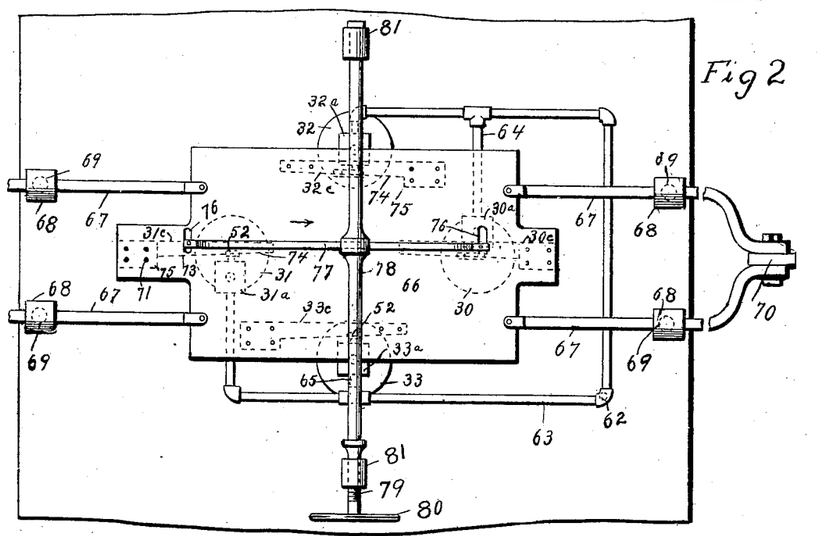
Fig. 2 is a top plan view thereof.
Figure 3:
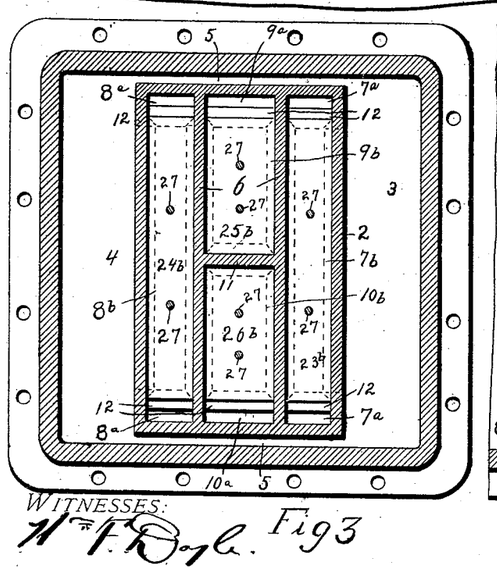
Fig. 3 is a horizontal section on the line 3—3 of Fig. 1.
Figure 4:
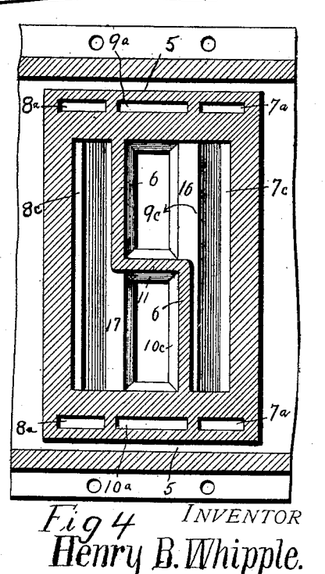
Fig. 4 is a horizontal section on the line 4—4 of Fig. 1.
Figure 5:
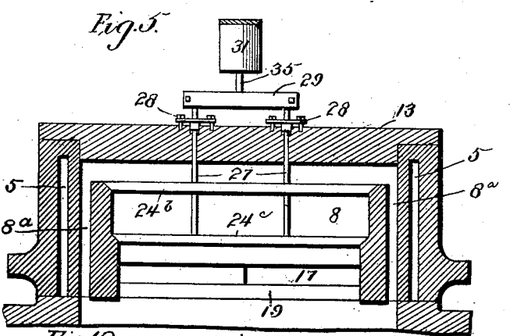
Fig. 5 is a vertical transverse section on the line 5—5 of Fig. 1.

The steam admitted into the operating cylinder valves may be from any desired source of supply, but in the preferred embodiment of the invention steam is fed thereto from a chamber of the steam chest C by means of a pipe 62 having connection with an auxiliary valve supply main 63. The main 63 is arranged as shown in Figs. 1 and 2 and has connection at its end with the ports of the valves $31^a$ and $33^a$. Branch pipes 64 and 65 from the main 63 lead respectively to the valves $30^a$ and $32^a$. Communication is established between the auxiliary valves and the various cylinders controlled thereby by conductors leading from the ports 44 of said valves and illustrated in Figs. 2 and 6. The valves $30^a$ and $31^a$ communicate with and are supported from the cylinders 30 and 31 by respective conductors $30^b$ and $31^b$ introduced into the lower portion of said cylinders. The valves $32^a$ and $33^a$ communicate with and are supported from the cylinders 32 and 33 by respective conductors $32^b$ and $33^b$ introduced into the upper portions of said cylinders.

The auxiliary valves are operated by movable elements engaging the levers 52. To this end a sliding plate 66 is provided, which carries at its ends outstanding horizontal arms 67 by which said plate is supported in operative position. In this function the arms 67 project through suitable bearings or boxes 68 carried by vertical supporting posts 69 mounted upon the steam chest C. The elements for actuating the levers 52 comprise keys carried upon the plate 66 and respectively designated $30^c$, $31^c$, $32^c$ and $33^c$, according to the valve designed to be operated thereby.

The plate 66 is reciprocated with the piston of the engine and to this end has connection by any approved means, as at 70 from the converging ends of one of the pairs of arms 67, with the upper end of a stationarily pivoted lever fulcrumed at its lower end to the piston cross head so that as the piston moves ahead in the cylinder the plate 66 moves backward and vice versa. In the movement of the plate 66 in one direction, the valves $30^a$ and $32^a$ are taking steam to open and close their respective admission and exhaust valves and in the movement of the plate 66 in the opposite direction, the valves $31^a$ and $33^a$ are taking steam to open and close their respective admission and exhaust valves. To effect this relative operation of the valves above named, the keys $30^c$ and $32^c$ are similarly arranged so as to engage the respective valves on one stroke of the piston and the keys $31^c$ and $33^c$ are similarly arranged with respect to one another, but oppositely arranged with respect to the keys first named, so as to engage the respective valves on the opposite stroke of the piston.

The keys $32^c$ and $33^c$ for operating the auxiliary exhaust valves are counterparts in construction and the keys $30^c$ and $31^c$ for operating the auxiliary admission valves are counterparts in construction and are provided with an adjustably movable element. A description of the key $31^c$ which is shown in detail in Fig. 11 will apply also to the key $30^c$. The key $30^c$ comprises a stationary rectangular element 71, rigidly secured to the plate 66 and formed on its inner side with a longitudinal dovetail groove 72. A wedge shaped member 73 of less width throughout than the element 71, and having an inclined face 74, slidably interfits the groove 72 and is adjustable therein. In any position of the member 73 with relation to the element 71, one corner of said element projects beyond said key so as to form a shoulder 75 for engagement with the lever 52 in a manner to be described. The keys $32^c$ and $33^c$ are of substantially the same shape as the keys $30^c$ and $31^c$ in their entirety, but are integral and nonadjustable. Said keys $32^c$ and $33^c$ are rigidly secured to the plate 66 and are each likewise formed with an inclined face 74 and an angular shoulder 75. The plate 66 is formed adjacent its ends with short length slots 76, through which the depending ends of a yoke 77 project. The members 73 are rigidly secured to the ends of the yoke 77 which in effecting an adjustment of the members 73 have movement in the slots 76. The yoke 77 passes loosely through but is movable with a transverse rod 78 which terminates in a threaded end 79 and carries a hand wheel 80. The rod 78 is journaled in bearings 81 carried by supporting posts 82. The bearing 81 in which the threaded end 79 of the rod 78 is journaled is threaded to mesh with the threads 79 and to effect a reciprocating movement of said rod 78 in its bearings when the hand wheel 80 is rotated.

Before entering upon the detailed discussion of the operation a brief résumé of the working conditions is necessary. As shown in Fig. 1 the valves $30^a$ and $32^a$ are discharging steam into the cylinders 30 and 32. When the cylinders 30 and 32 are taking steam to move the pistons therein and open the admission valves $23^b$ and $23^c$ and close the exhaust valves $25^b$ and $25^c$, the cylinders 31 and 33 are without steam and the pistons are actuated by the springs provided therefor, the piston in the cylinder 31 being forced downwardly to close the admission valves $24^b$ and $24^c$ and the piston in the cylinder 33 being forced upwardly to open the exhaust valves $26^b$ and $26^c$. On the reverse movement of the engine piston B and the plate 66, the steam is cut-off from the cylinders 30 and 32 and is admitted into the cylinders 31 and 33 with a reversal of the position of the valves, from that above described.

Steam is admitted to the steam chest C at any desired point. In the position of valves shown in Fig. 1, steam enters the valve chamber 7 of the compartment 2 through the opening 14 and passes simultaneously through the valve seat $7^b$ and $7^c$ into the upper and lower portions of said chambers. The steam entering the lower portion of the chamber 7 passes through the passage 18 and steam inlet 20 into the adjacent end of the cylinder A. The steam entering the upper portion of the chamber 7, passes downwardly through the passages $7^a$ into the inlet 20 and through said inlet into the end of the cylinder in communication therewith. Simultaneously steam is exhausting from the opposite end of the cylinder A through the inlet 21, passage 19, core 17 of valve chamber 8 and into the chamber 10. When the steam is exhausting at that end of the cylinder, the valves 26$^b$ and 26$^c$ being open, it passes through double openings, going through valve seat 10$^c$ into the recess 22 in the cylinder A and through the valve seat 10$^b$ into the chamber 10 and thence through the passage 10$^a$ into recess 22. The steam having completed its work is exhausted from the recess 22 at any desired point and by any approved exhaust mechanism. When the position of the valves is reversed from that shown in Fig. 1 and described above, the steam enters the cylinders through the valves 24$^b$ and 24$^c$, and the valves 25$^b$ and 25$^c$ being then open, exhausts from the valve chamber 9 in precisely the same manner as above set forth.

Figures 6, 12, 13, 14:
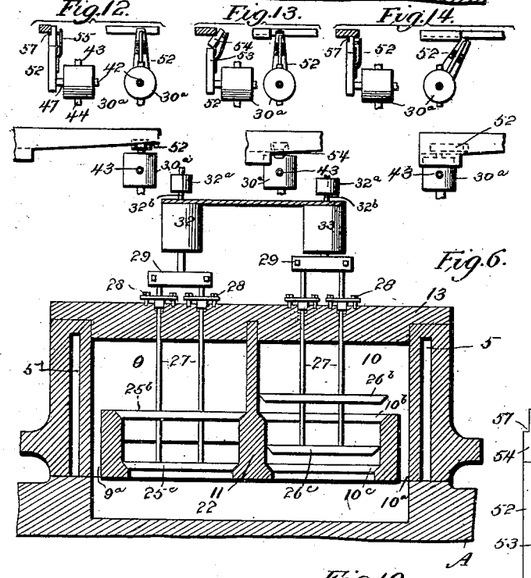
Fig. 6 is a vertical transverse section on the line 6—6 of Fig. 1.
Figs. 12, 13 and 14 are views illustrating in respective series of side, front and end elevations the various positions and mode of operation of the valves shown in Figs. 9 and 10 when engaged by the element shown in Fig. 11.

In describing the operation of the plate 66, the keys carried thereby and the auxiliary valves operated by said keys, reference is had to Fig. 1 showing the relative positions of said valves during the movement of the plate 66, and to Figs. 12, 13, and 14 showing, diagrammatically, the mode of operation. As shown in Fig. 2 the plate 66 is moving in the direction of the arrow, the valves 30$^a$ and 32$^a$ are being held open by the respective keys, to discharge steam into the operating cylinders 30 and 32, and the lever 52 of the valves 31$^a$ and 33$^a$ are being initially engaged by their respective keys. Hence it will be apparent that on the movement of the plate 66 in one direction one pair of keys, depending on their arrangement, will initially engage the actuating levers of the respective auxiliary valves, and that the other pair of keys will be in operative engagement with the levers of the respective auxiliary valves, and that at the termination of the stroke, said operatively engaged levers will be released from engagement with said keys and will be restored to normal position by the means herein described, while on the stroke of the plate 66 in the opposite direction, the last named pair of keys will again initially engage the operating levers, and the first named pair of keys having completed their initial engagement with said levers, will be in operative engagement therewith.

The manner of engagement of the keys and operating levers is as follows: For the sake of example we will describe the initial engagement of the key 31$^c$ with the lever 52 of the valve 31$^a$. The inclined surface 74 of said key engages the section 54 of the lever 52 above the shoulder 57 and as said key continues to move rearwardly, the inclined surface 74 thereof acts as a cam and depresses the hinged section 54 as is shown in Fig. 13. The pivotal movement of said lever commences when the section 54 is engaged by the shoulder 75 of the element 71, and as said lever is swung on its pivot, the section 54 thereof is moved by its spring back into the same plane as the body of the lever, and said lever is held beneath the key in the position of Fig. 14 which is the dotted line position of Fig. 10. In this position of the lever the respective auxiliary valve controlled thereby is opened for the discharge of steam into the operating cylinder. When the lever has been swung or rocked on its pivot in the manner set forth and the valve has thus been opened, said lever will be maintained in such position throughout the reverse stroke of the piston. Said lever clears the key at the narrow end thereof, or at any selected point along the inclined surface 74, at which time the spring 68 will act to restore the lever to normal perpendicular position as shown in the full line of Fig. 10. It will be noted that as long as either one of the valves 30$^a$ or 31$^a$ are held open, the corresponding admission valves in the steam chest C will be held open through the mechanism described. The amount of steam admitted into the engine cylinder, will depend upon the length of time that the admission valve is held open, and the length of time that the admission valve is held open, will depend upon the adjustment of the member 73 of the auxiliary admission valve key with respect to the element 71 thereof. It will be readily understood that by moving the inclined face 74 towards or away from the adjacent lever 52, said lever will have a longer or a shorter period of engagement beneath the key, and its action thereupon will depend entirely upon the relative position of the member 73. The adjustment of the member 73 and the keys 30$^c$ and 31$^c$ is simultaneous and is effected by rotating the rod 78 so that the threaded portion 79 thereof will serve to feed said rod in the direction of its longitudinal axis. In this movement of the rod, the yoke 77 is carried therewith, and the members 73, being secured to the ends of said yoke, which have movement in the slots 76 of the plate 66, will be moved therewith, the dovetail groove 72 of the element 71 serving as a guide therefor. The keys 32$^c$ and 33$^c$ are cast integral and have no adjustment, so that their engagement with the adjacent lever 52, is constant and always occurs at the same point in the stroke of the piston, irrespective of the timing of the operation of the admission valves.

It will be readily apparent that the construction herein set forth, to wit, of the steam actuating pistons in the operating cylinders permits of the practically instantaneous operation of the respective valves controlled thereby. It will be further apparent that the arrangement of the admission and exhaust valves, together with the admission valve regulating means, permits of increasing or decreasing the amount of steam admitted to the engine cylinder, which will depend upon the time said admission valve is held open, without effecting the distance of travel of the steam within the engine cylinder. From the description of the chambers of both the admission and exhaust valves, it will be readily observed, that a full supply of steam can enter or egress from the cylinder in an instant, owing to the large admission and discharge area formed by the novel arrangement and construction of parts.

The above description relates especially to engines of the stationary type and the description that follows deals with the modified construction shown in Figs. 15 to 20, in which the invention is disclosed as adapted for use with a traction or "reversing" engine. In this connection the construction of the steam chest and the cylinder is the same as in the embodiment of the invention previously discussed, but the valve operating mechanism while based on the same principle of construction and operation, differs as to the details of arrangement and construction of a number of the elements, in order to permit of the provision of a reversing mechanism.

Figure 15:
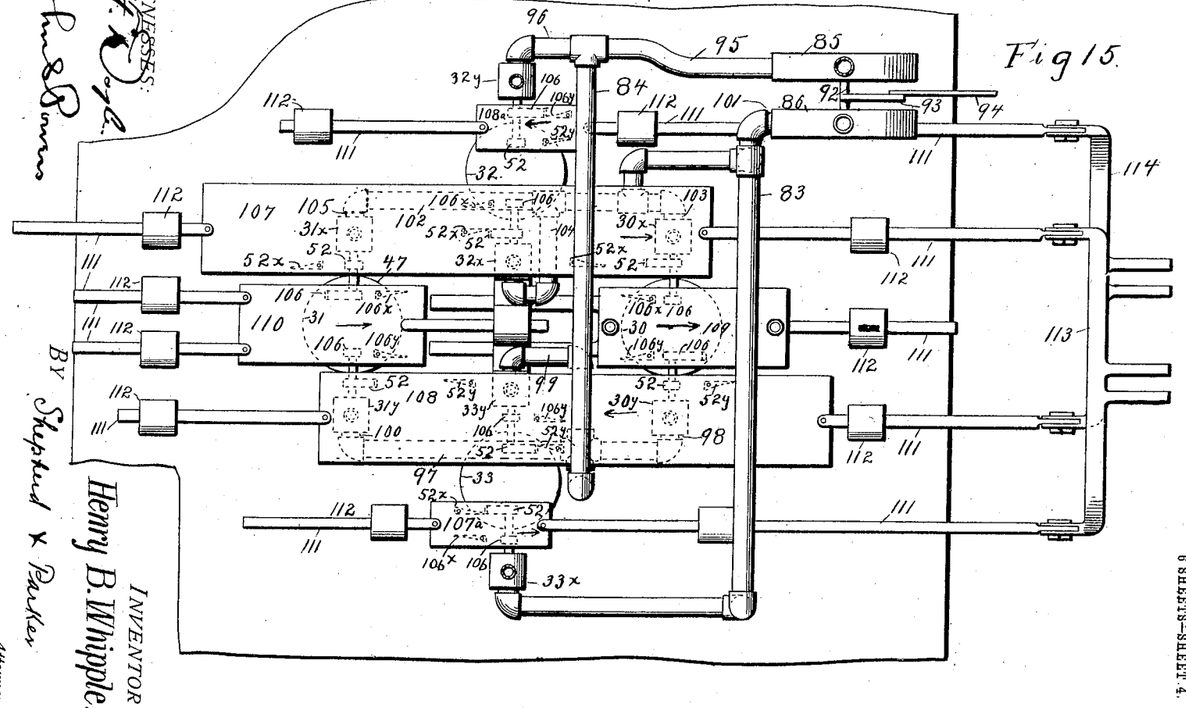
Fig. 15 is a top plan view illustrating the invention as applied to a locomotive engine.
Figures 16, 17, 18, 19, 20:
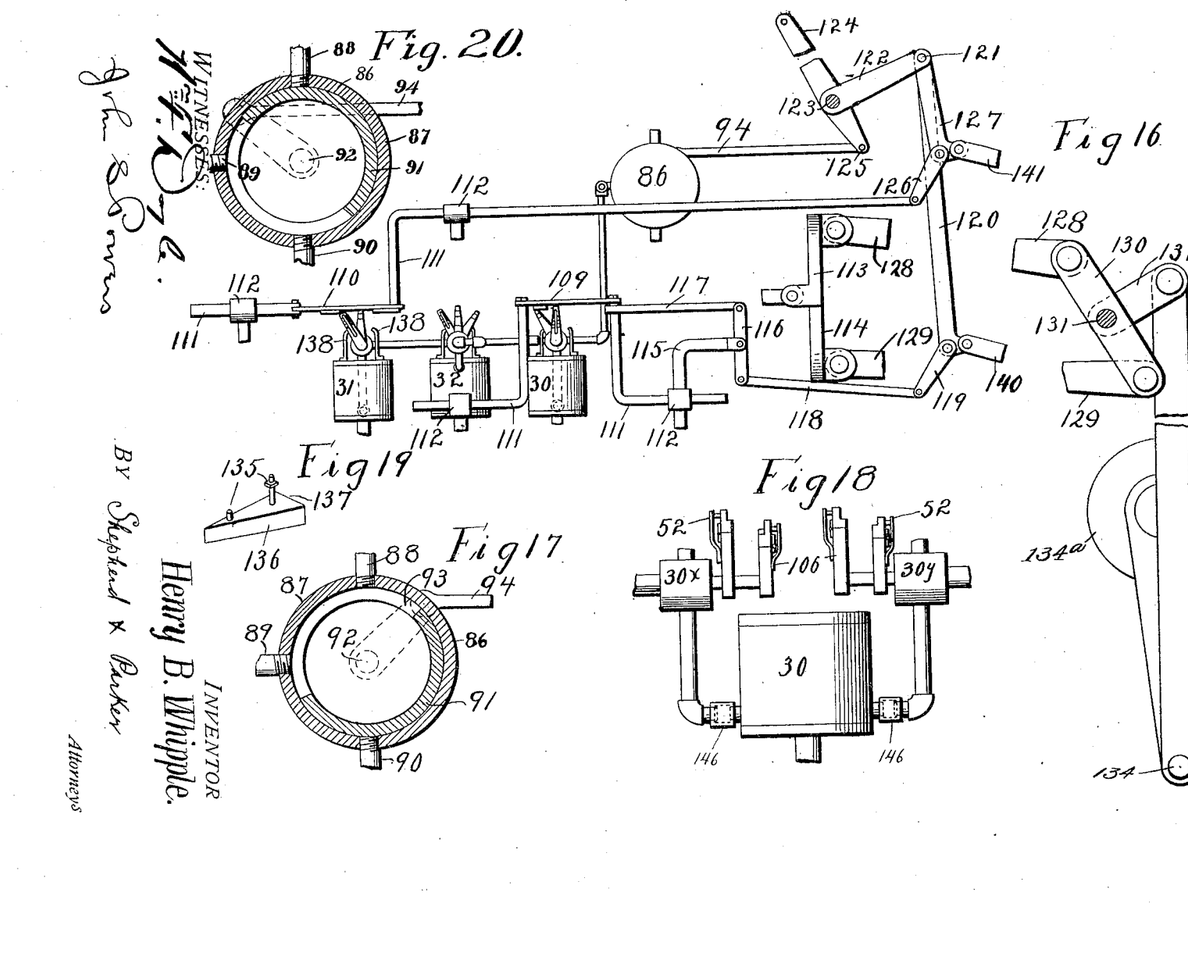
Fig. 16 is a side elevation of the reversing gear employed with a locomotive or any reversing engine.
Fig. 17 is a vertical longitudinal view of a rotary throttle valve for controlling the admission of steam to the auxiliary valves of the main valve operating cylinders.
Fig. 18 is an end elevation of the valve operating chamber.
Fig. 19 is a perspective view of a key employed for operating the valve and appurtenant elements thereof shown in Fig. 18.
Fig. 20 is a section illustrating one of the throttle valves for controlling the supply of steam to the forward and reverse auxiliary valves, in a reverse position to that of the valve shown in Fig. 17, the valves in Figs. 17 and 20 being respectively opened and closed.

As shown in Figs. 15 and 16 the operating cylinders 30, 31, 32 and 33 are employed, and possess the arrangement and construction herein detailed. It is assumed for the sake of convenience of explanation, that the working conditions are the same as in the operation set forth, in which the cylinders 30 and 32 are taking steam, for the operation of their respective valves according to the functions contemplated and that the cylinders 31 and 33 are without steam, but have their pistons in operation by the springs, in accordance with the function set forth.

As shown in Fig. 15 the various operating cylinders are each provided with two auxiliary valves, on each side thereof, communicating with the cylinders at the same relative point. These valves are respectively designated $30^x$ and $30^y$, $31^x$ and $31^y$, $32^x$ and $32^y$ and $33^x$ and $33^y$. The various auxiliary valves are of the same construction as the auxiliary valves herein described, and which are shown in detail in Figs. 9 and 10 except $31^x$ and $31^y$ which have the same operative principle, but which have the steam and exhaust ports reversed as regards their relative positions with respect to the operating lever. It is not deemed necessary to show this slight difference. The valves arbitrarily distinguished by the exponent $x$ are employed when the engine is moving in one direction and the valves distinguished by the exponent $y$ are employed when the engine is moving in a reverse direction, as is shown in Fig. 15. While the movable elements of the valves are all engaged during the action of the engine, it is to be kept in mind that only the elements of the valves employed for moving the engine in a selected direction are operatively engaged by the actuating devices. It is assumed for convenience of description, that the operating cylinders of the engine valves are controlled from the auxiliary valves distinguished by the exponent $x$. The valves $30^x$, $31^x$, $32^x$ and $33^x$ have communication with a main 83 from the source of supply and the valves $30^y$, $31^y$, $32^y$ and $33^y$ have communication with an independent main 84 from the source of supply. The steam entering the mains 83 and 84 is controlled by respective throttle valves 86 and 85 which are substantially counterparts in construction, but differ in the arrangement, the valve 86 being shown in detail in Fig. 17.

Figures 21, 22, 23:
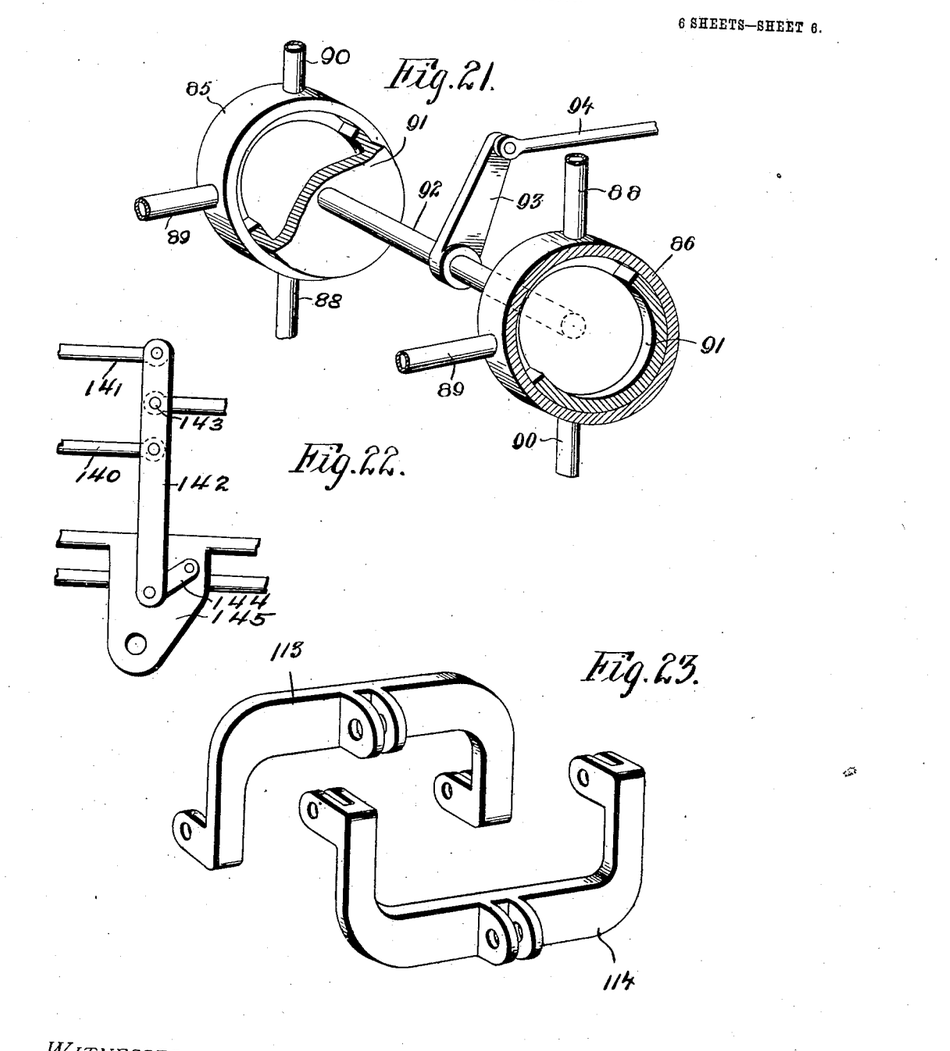
Fig. 21 is a view illustrating diagrammatically the construction and relation of the throttle valves, one of which is illustrated in detail in Figs. 17 and 20.
Fig. 22 is a view of the mechanical connections between the admission auxiliary valve cut-off plates and the engine cross head.
Fig. 23 is a perspective view showing the relation of the valve plate connecting bridles of the engine shown in Fig. 15.

As shown in Fig. 21 the throttle valve 85 comprises an annular shell 87 which is formed with a steam inlet port 90 arranged in the upper portion thereof, a steam discharge port 89 through which steam is educed to the auxiliary valves, and an exhaust port 88 arranged in the lower portion thereof. The various ports 88, 89 and 90 are controlled by a rotary semi-annular plate 91 fitting snugly within the shell 87 and revoluble therein so as to overlie and close the respective admission and exhaust ports. The valve 86 as above intimated, is constructed substantially as the valve 85, but differs therefrom in the arrangement of parts in that the plate 91 is reversely arranged to that described and the ports 88 and 90 are arranged in the upper and lower portions of the shell 87 instead of vice versa as in valve 85. Thus, the relative positions of the valves 85 and 86 are such that when steam is admitted to the auxiliary valves controlled by the valve 85 through ports 90 and 89 the admission port 90 of valve 86 is closed and ports 88 and 89 are in communication, allowing steam from port 89 to exhaust and vice versa. In this relation the valves 85 and 86 are operated simultaneously and to this end the plates 91, have connection in any approved manner with a rock shaft 92 transversely journaled between the shells 87, in the confronting adjacent sides thereof. The rock shaft 92 has rigid connection with a lever 93 which is swung by a reciprocating link 94 in a manner to be hereinafter described. The main 84 has connection with the port 89 of the valve 85 by means of a pipe 95. Said main communicates with the valve $32^y$ by a branch pipe 96 and it connects at its opposite end with manifold 97 through which leads pipes 98, 99 and 100 communicating respectively with the valves $30^y$, $33^y$ and $31^y$. The main 83 communicates with the port 89 of the valve 86 by a pipe 101 and with a manifold 102 from which lead pipes 103, 104 and 105 communicating respectively with the valves $30^x$, $32^x$ and $31^x$. The free end of the main 83 communicates with the valve $33^x$.

Check valves 146 are interposed in the pipes leading from the auxiliary valves designated by the respective exponents $x$ and $y$ to the respective operating cylinders. This construction is clearly illustrated in Fig. 18 wherein the valves 146 are shown as applied adjacent to the auxiliary valves $30^x$ and $30^y$. The function of the valves 146 is to prevent leakage of the steam from the operating cylinders through the auxiliary valves on each side thereof, inasmuch as the pistons in the cylinders do not fit so snugly as to hold the pressure after the supply is shut off.

In the modified construction, the wedge shaped keys for regulating the length of time during which the auxiliary valves remain open, and the spring devices for restoring said valves to normal position, are eliminated, and in lieu thereof the boss 47 carries a lever 106 of the same construction as the lever 52, and mounted upon the outer end of the post 47 which is of somewhat greater length than in the preferred embodiment of the invention. Independent actuating devices are employed for the levers 52 and 106. These actuating devices are counterparts in construction and it is to be borne in mind in connection therewith that the lever 52 is engaged to open the adjacent valves and that the lever 106 is engaged to close the adjacent valve. It is necessary in this function, that the levers 52 and 106 be moved in different directions. To this end a novel arrangement of actuating elements is employed, comprising sliding plates carrying on their underneath surface short length keys for engagement with the levers 52 and 106. The several plates operate in corresponding pairs and each pair has connection with the main crank pin of the engine. The main operating plates are designated by the numerals 107, 108 and carry keys which operate to open the adjacent admission auxiliary valves and to open and close the adjacent exhaust auxiliary valves. Plates 107 and 108 act in coöperation with plates $107^a$ and $108^a$ for opening and closing the exhaust auxiliary valves adjacent thereto. The admission auxiliary valves are arranged with their closing levers 106 adjacent one another and said levers are operated by elements carried upon plates 109 and 110 arranged between the plates 107 and 108. The several plates are individually of substantially the same construction as the plate 66, and are severally provided at each of their ends with outwardly extending arms 111 which have slidable movement and are guided in bearings 112, suitably supported from the steam chest C. The plates 107 and $107^a$ in their co-acting relation have movement in the same direction and to this end the arms 111 at the same end thereof have connection with a bridle 113. In like manner the plates 108 and 108ᵃ have connection with a bridle 114. The bridles 113 and 114 have connection with the main crank pin of the engine and are driven therefrom in opposite directions. The plates 109 and 110 have movement in the same direction with relation to one another. While the plates 109 and 110 are traveling their full distance in the same direction, plates 107 and 107ᵃ move half of their travel in one direction and half in the opposite direction, and the movement of plates 108 and 108ᵃ are directly opposite to the movement of plates 107 and 107ᵃ. This relative movement is due to the fact that the motion of plates 107, 107ᵃ, 108 and 108ᵃ is taken from the main crank pin, half of the travel being accomplished by the rotation of said crank pin from its lowermost position to its uppermost position and the other half of the travel of said plates being accomplished by the rotation of said crank pin from its uppermost position to its lowermost position. On the other hand the movement of plates 109 and 110 is taken from the engine cross head, plate 110 being connected as hereinafter described to a suitable point above the fulcrum of a lever operated from the engine cross head, and plate 109 being connected as hereinafter described to a similar point located below said first named fulcrum point as shown in Fig. 22. Hence, it will be seen that while the engine piston moves from one end of the cylinder A to the other end, plates 109 and 110 have accomplished their entire length of travel in the same direction. But during such movement of the engine piston the main crank pin gives an upward movement to the throw lever of the plates 107 and 108 and a downward movement to lever or vice versa, in accordance with the direction in which the engine is running. The plates 109 and 110 are driven from the cross head of the engine and have common connection with a system of levers for adjusting the relation of the cut-off to the engine piston in a manner to be described. As shown in Fig. 16 the bearing 112 adjacent the plate 109 carries an angular post 115 to the end of which a lever 116 has central pivotal connection. The lever 116 has pivotal connection at the upper end with an arm 117 by which said lever is operatively connected to the plate 109. The lower end of the lever 116 has connection with a link 118 which in turn is pivoted to a compensating link 119 carried upon the end of a prime lever 120. The lever 120 is suspended from a suitable fulcrum 121, upon the end of an arm 122, rigidly mounted upon a rock shaft 123, which is moved in the proper direction by a reversing lever 124 secured thereto at a central point, and having pivotal connection at its lower end as at 125 with the end of the link 94. The connecting arm 111 of the plate 110 extends rearwardly to a point adjacent to the lever 120 where it has pivotal connection with a compensating link 126 pivoted upon the lower end of a short lever 127 which is likewise suspended from the fulcrum 121 of the lever 120.

The levers 120 and 127 are operated from the cross head and to this end, as shown conjointly in Figs. 16 and 22, have pivotal connection with links 140 and 141 which in turn are pivoted to a lever 142 below and above the stationary fulcrum 143 of said lever. The lever 142 is fulcrumed at its lower end to a compensating lever 144, in turn pivoted to the cross head 145 of the engine. It will be readily apparent that the lever 141, being connected to the cross head lever 142 above the fulcrum 143 thereof, will, together with the plate 110 and the appurtenant connections have movement in a direction opposite to that of the engine piston, and that the lever 140 will have movement in a direction opposite to that of the lever 141. In order to give plate 109 the same movement as plate 110, the rocking lever 116 is introduced between the lever 140 and the plate 109 as above described, as otherwise, said plate 109 would move in the same direction as the engine piston, its connection to cross head lever being just below the fulcrum point thereof.

The yokes 113 and 114 and the respective plates connected therewith have movement in opposite directions as above intimated and to this end are operated by eccentric link connections from the main crank pin of the engine 134ᵃ. The yoke 113 is pivotally connected to a link 128 and the yoke 114 is pivotally connected to a link 129. The links 128 and 129 have pivotal connection with the respective upper and lower ends of a T lever 130 mounted at a central point upon a stationary shaft 131 and carrying adjacent to said shaft a central arm 132 extending at right angles and which is fulcrumed to the end of a link 133 which in turn is fulcrumed as at 134 to a crank arm carried by the main crank pin of the engine. As the main crank pin is given its motion from the engine piston, so it in turn gives a rotary motion to the crank arm, which gives an up and down movement to the arm 132 by means of the connecting lever 133. It is evident from the drawing that the eccentric rod 128 will be moved in one direction and eccentric rod 129 will be moved in the reverse direction by the means just described.

The elements for operating the levers 52 and 106 comprise keys 52ˣ and 106ˣ upon the plates 107, 107ᵃ, 109 and 110, and keys 52ʸ and 106ʸ upon the plates 108, 108ᵃ, 109 and 110. The keys above mentioned are counterparts in construction and are shown in detail in Fig. 19. Each of said keys embodies pins 135 by which they are secured to the various plates and wedge shaped keys formed with an inclined surface 136 designed to ride past the hinged section 54 of the levers 52 and 106 in order that the key can engage said levers, with its straight side 137 which serves as a shoulder on the return movement of the plate. The operation of keys 106ˣ and 106ʸ is similar to this. It is to be borne in mind that when steam is admitted to the valves designated by the exponent $x$ the valves designated by the exponent $y$ are without steam.

As previously pointed out, the various auxiliary valves for admitting steam into the operating cylinders remain open until the closing levers 106 thereof are engaged by the key 106ˣ and tripped to close said valves. The movement of the lever in either direction is restricted by stops 138 mounted upon the operating cylinders. The adjustment of the time the steam valves remain open is effected by changing the positions of the plates 109 and 110 which carry the keys for closing the admission valves with relation to the position of the engine piston in its travel in the cylinder. The relative positions of the plates 109 and 110 are changed by moving the lever 124 towards or away from a perpendicular position, and imparting corresponding movement to the links 120 and 127 which, through the compensating links 119 and 126 transmit corresponding movement to the plates 109 and 110.

When it is desired to reverse the direction of movement of the engine the lever 124 is moved to a point beyond its perpendicular position and directly opposite to the position disclosed in Fig. 16. This movement of the lever 124 closes the throttle valve 86 and permits the steam to exhaust from the port 88 thereof and opens the throttle valve 85, so that steam communication is had through the ports 90 and 89 to the main 84 and the various valves designated by the exponent $y$, and fed therefrom. The reversing operation is accomplished entirely by changing the supply of steam leading to the auxiliary valves from the main 83 to main 84 or vice versa. As the reversing lever 124 is pulled backward from the position shown, controlling valve 86, is in operative position until the lever 124 is at a central point, when both the controlling valves 85 and 86 are in lap positions, or having the admission port 90 closed and the ports 89 and 88 open. As the lever is pulled rearwardly away from perpendicular central position controlling valve 86 continues to be inoperative and controlling valve 85 is in the operative position. The adjustment of the cut-off through levers 120, 119, 118, 116 and 117 for plate 109 and through levers 127, 126 and 111 for plate 110, is in operation as the reversing lever 124 is moved. At the termination of the movement of the lever 124 on either side thereof, the cut-off adjustment is the same as regards the operation of the plates 109 and 110 with relation to the engine piston, that is, giving the longest cut-off of steam admission valves and as lever 124 is moved from either extreme limit of its travel, the cut-off is shortened, since the plates 109 and 110 are made to operate the auxiliary valve levers before the engine piston travels as far as it will in the event of the lever 124 being at either extreme limit of its movement. In other words, as the lever 124 is moved from either side to a central or perpendicular position, the plates will be moved through their connections, so that the keys will engage the auxiliary valve levers and close the steam admission valves successively earlier in the stroke of the piston, in accordance with the movement of lever 124 to central position, and the adjustment of the admission valve cut-off can be thus regulated as desired. In allowing the engine to run idle by moving the valves into "drifting" position, the lever 124 is moved to central position. In this position of said lever, controlling valves 85 and 86 are inoperative. The admission and exhaust valves are then in their normal positions, viz, all the admission valves being held to their seats or closed and all the exhaust valves being held away from their seats or open. In this position, as previously set forth, both ends of the engine cylinder are open to the atmosphere and to one another through the exhaust ports so that the engine piston will be perfectly free to move without pumping when the engine is running under momentum. The main valves may be advantageously "drifting", when the engine is standing still, since in the event of leakage from the throttle valves no steam could pass the steam admission valves, but even assuming that owing to some unforeseen reason, steam should pass the admission valves and escape into the cylinder, it would egress through the exhaust and the safety of a locomotive engine when standing still is thus assured.

It is readily apparent that the reversing device shown in Fig. 16, can be advantageously used with the reversing lever employed on the ordinary steam engine, so that while the detailed operation is radically different from that of the ordinary steam engine, this employment of the mode of reversing the original steam engine, eliminates confusion and misunderstanding of the operation, and the dangers consequent therefrom.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. A steam chest for engines comprising a casting formed with communicating steam inlet chambers, an exhaust chamber located therebetween having an exhaust valve therein, a compartment in said casting formed with independent admission ports individually in communication with the said steam inlet chambers and with the engine cylinder at the ends thereof, and with independent exhaust ports located adjacent said exhaust chamber and having individual communication with the respective admission ports.

2. A steam chest for engines comprising a casting formed with independent admission valve chambers communicating with the engine cylinder at the ends thereof and independent exhaust valve chambers located between said admission valve chambers and severally having individual and respective communication therewith, all of said valve chambers having direct and circuitous communication with the engine cylinder by independent steam passages.

3. A steam chest for engines comprising a casting formed with independent admission valve chambers and independent exhaust valve chambers, all of said chambers being severally formed with upper and lower valve seats, said casting being formed with independent passages extending in a direct line of travel to the engine cylinder from said lower valve seat and with independent passages extending in a circuitous line of travel from said upper valve seat.

4. A steam chest for engines comprising a casting formed with independent admission valve chambers and independent exhaust valve chambers having individual and respective communication with said admission valve chambers, all of said valve chambers being formed with upper and lower valve seats, said casting being formed with passages leading to the engine cylinder in a direct line of travel from said lower valve seats and in a circuitous line of travel from said upper valve seats.

5. A steam chest for engines comprising a casting formed with communicating steam inlet chambers, an exhaust chamber located therebetween, suitable admission and exhaust ports in communication with said chambers and with the engine cylinder, said chambers being provided with double valve seats located therein respectively above and below the source of supply, and valves severally formed with double bearing surfaces and movable in said chambers.

6. A steam chest for engines comprising a casting formed with independent admission valve chambers having communication with a source of steam supply and independent exhaust valve chambers having individual communication with the respective admission valve chambers, all of said valve chambers being formed with double valve seats arranged above and below their respective points of communication with said source of supply and having independent communication with the engine cylinder from said valve seats, and valves movable in said chambers and severally formed with double bearing surfaces having coextensive steam exposed areas.

7. A steam chest for engines comprising the combination with a source of steam supply and an engine cylinder, of a casting formed with admission valve chambers at each side thereof communicating respectively with said source of supply and with said engine cylinder at opposite ends thereof and an exhaust valve chamber located between said admission valve chambers and having respective communication therewith by independent passages.

8. A steam chest for engines comprising a casting formed with communicating steam inlet chambers, an exhaust chamber located therebetween, suitable admission and exhaust ports in communication with said chamber and with the engine cylinder, said valve chambers having double valve seats and steam admission openings between said seats, valves mounted on said seats, rigid connections between said valves, said casting having steam discharge passages leading individually from said valve seats.

9. A steam chest for engines comprising a casting formed with communicating steam inlet chambers, an exhaust chamber located therebetween, suitable admission and exhaust ports in communication with said chambers and with the engine cylinder, each of said valve chambers having two registering seats, and having steam admission ports between said seats and steam discharge ports leading individually from said seats, two steam valves for engagement with said respective seats, rigid connections between said valves, said valves having confronting coextensive steam exposed areas.

10. A steam chest for engines comprising a casting having admission valve chambers located at each side thereof, an exhaust valve chamber located centrally there between and admission and exhaust valves in said respective chambers, said admission valve chambers having steam discharge passages communicating with the engine cylinder at opposite ends thereof, said exhaust valve chamber having a central portion affording independent compartments, each of said compartments having communication with said respective discharge passages and admission valve chambers.

In testimony whereof I affix my signature in presence of two witnesses.

HENRY B. WHIPPLE.

Witnesses:
R. G. CULLIRAN,
JOHN T. HYATT.